BUS DUCT WITH PARTICULAR HOUSING, INSULATION, AND BUS BARS

Original Filed Sept. 5, 1961 4 Sheets-Sheet 1

INVENTORS
Ernest W. Moodie
Merle R. Holman
Harris I. Stanback
By: Paul J. Rose Jr.
Atty.

Nov. 28, 1967 E. W. MOODIE ETAL Re. 26,310
BUS DUCT WITH PARTICULAR HOUSING, INSULATION, AND BUS BARS
Original Filed Sept. 5, 1961 4 Sheets-Sheet 2
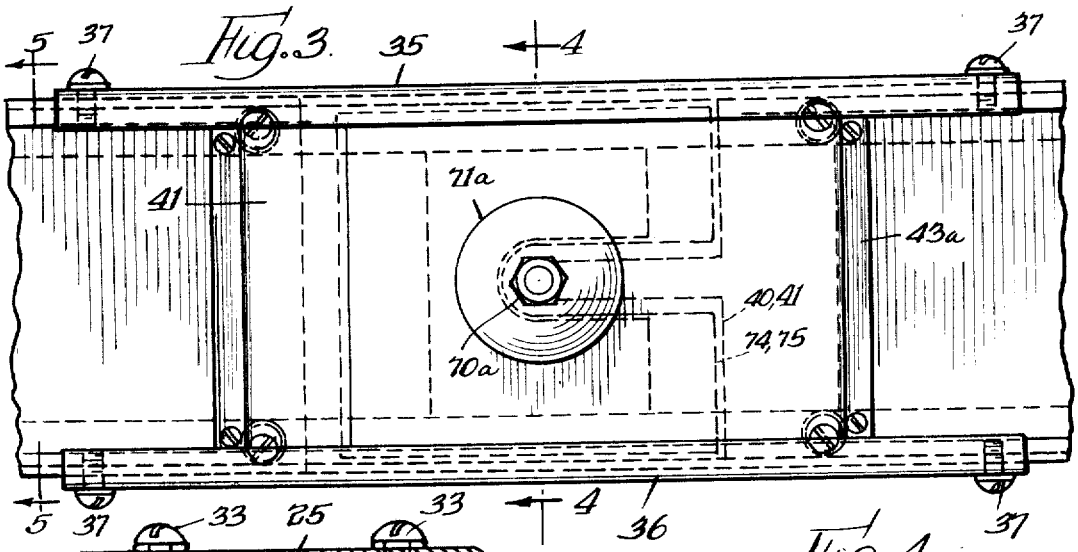
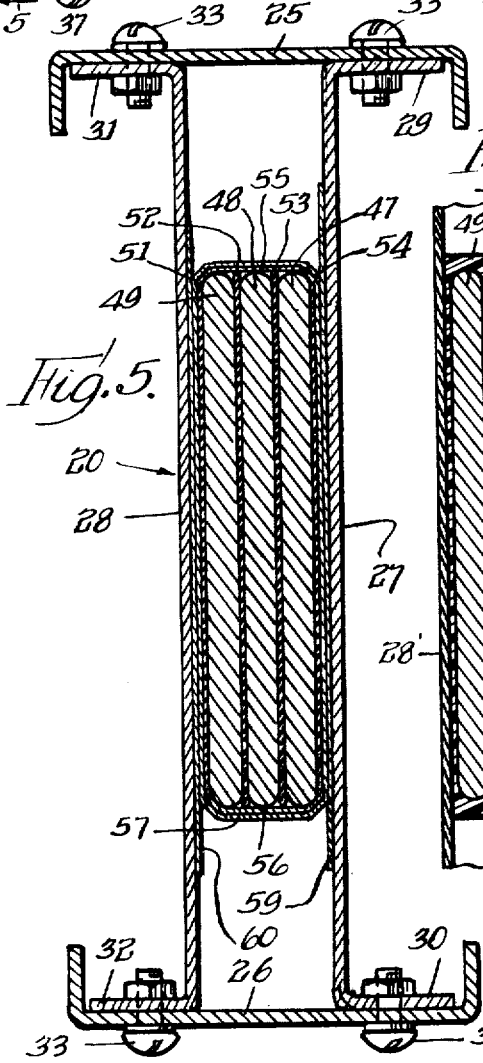
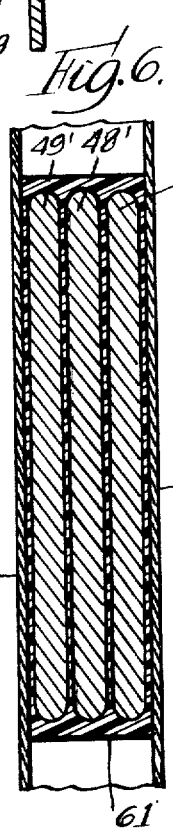
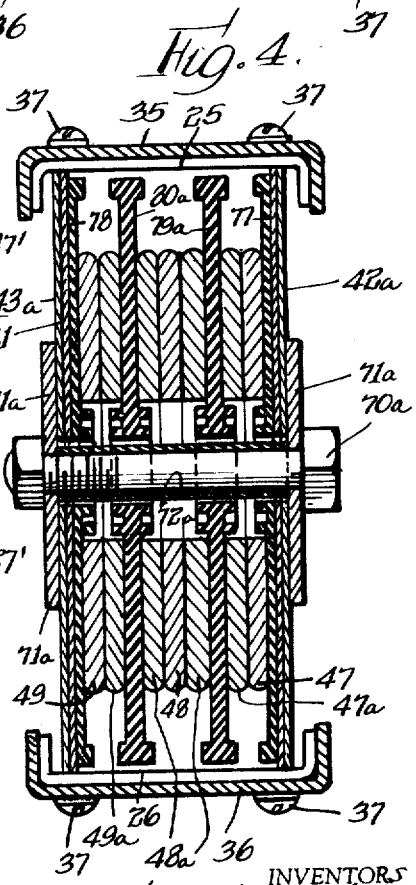
INVENTORS
Ernest W. Moodie
Merle R. Holman
Harris I. Stanback
By: Paul J. Rose Jr
Attys

BUS DUCT WITH PARTICULAR HOUSING, INSULATION, AND BUS BARS

Original Filed Sept. 5, 1961 4 Sheets-Sheet 3

INVENTORS
Ernest W. Moodie
Merle R. Holman
Harris I. Stanback
By: Paul J. Rose Jr.
Atty.

BUS DUCT WITH PARTICULAR HOUSING, INSULATION, AND BUS BARS
Original Filed Sept. 5, 1961 4 Sheets-Sheet 4
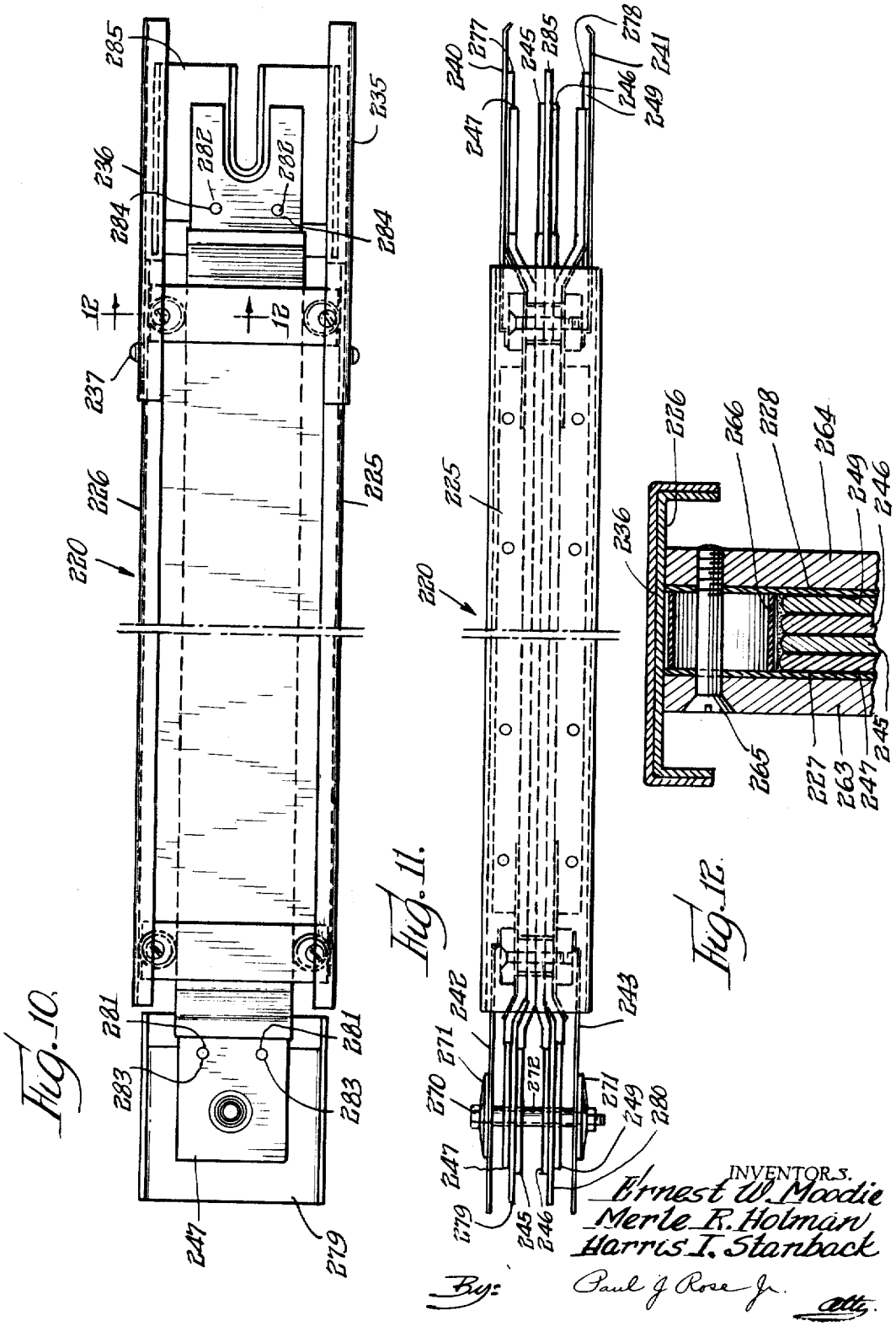

United States Patent Office

Re. 26,310
Reissued Nov. 28, 1967

26,310
BUS DUCT WITH PARTICULAR HOUSING, INSULATION, AND BUS BARS

Ernest W. Moodie, Downsview, Ontario, and Merle R. Holman, Rexdale, Ontario, Canada, and Harris I. Stanback, Lexington, Ky., assignors to Square D Company, Park Ridge, Ill., a corporation of Michigan Original No. 3,187,086, dated June 1, 1965, Ser. No. 135,852, Sept. 5, 1961. Application for reissue May 29, 1967, Ser. No. 646,754
30 Claims. (Cl. 174—68)

Matter enclosed in heavy brackets [ ] appears in the original patent but forms no part of this reissue specification; matter printed in italics indicates the additions made by reissue.

*ABSTRACT OF THE DISCLOSURE*

*The bus duct housing is made from two pairs of metal channels arranged to define a generally rectangular opening. An insulated assembly of closely-spaced bus bars is positioned within the opening in spaced relation to one pair of the channels and is secured to the other pair of the channels and forms a solid connection therebetween.*

This invention relates to bus ducts for electrical distribution systems.

An object of the invention is to provide an improved construction for bus ducts wherein the bus bars are spaced closer together, thereby to decrease reactance, than has heretofore been practical, while at the same time insuring proper electrical insulation and adequate heat dissipation ability.

Another object of the invention is to provide an improved joint construction for bus ducts, whereby two standard lengths of the bus ducts may be assembled in series simply by telescoping the ends together, tightening one bolt which is already in position, and securing tie channels to one of the bus duct sections, the tie channels being already secured to the other bus duct section.

A further object of the invention is to provide an improved totally enclosed bus duct which is lighter and more compact than prior bus ducts.

A still further object of the invention is to provide an improved method of insulating the bus bars of a bus duct.

Yet another object of the invention is to provide an improved bus duct housing.

Another object of the invention is to provide an improved bus duct construction whereby standard lengths or sections of the bus duct may be assembled in place on previously installed hangers without the use of tools.

These and other objects of the invention will appear from time to time as the following specification proceeds and with reference to the accompanying drawings wherein:

FIGURE 3 is a side elevational view of the improved joint construction;

FIGURE 4 is a sectional view through the center of the joint, taken along the line 4—4 of FIGURE 3;

FIGURE 5 is an enlarged sectional view through one of the sections of bus duct formed in accordance with the invention, taken along the line 5—5 of FIGURE 3;

FIGURE 6 is a fragmentary sectional view similar to FIGURE 5 but illustrating an alternate construction;

Figure 7:
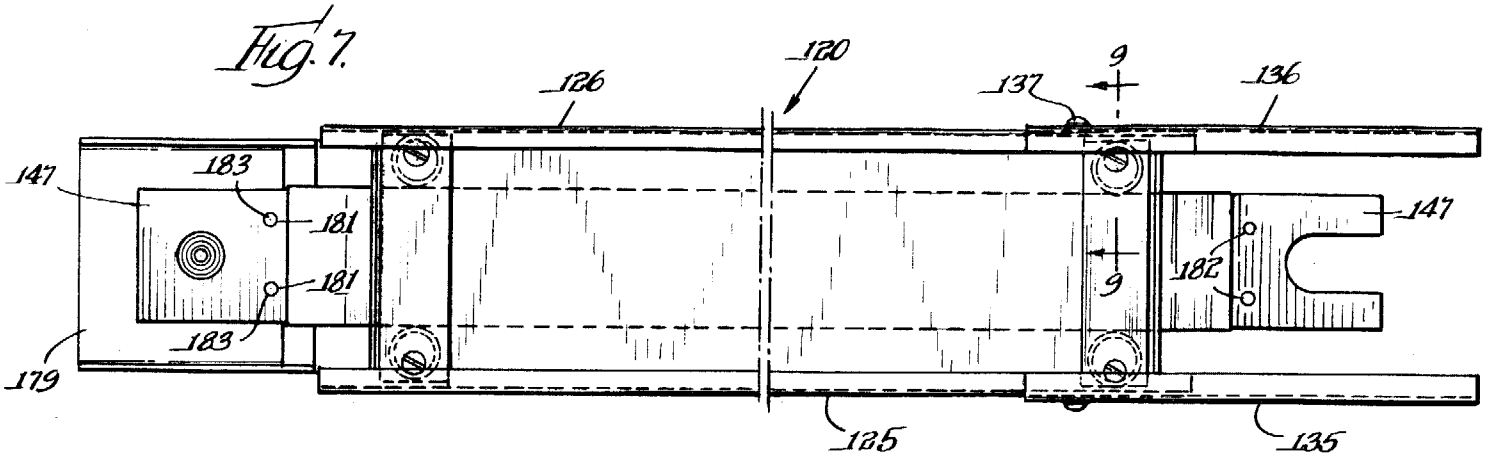
FIGURE 7 is a side elevational view of a section of the bus duct as it is assembled for shipment.
Figure 8:
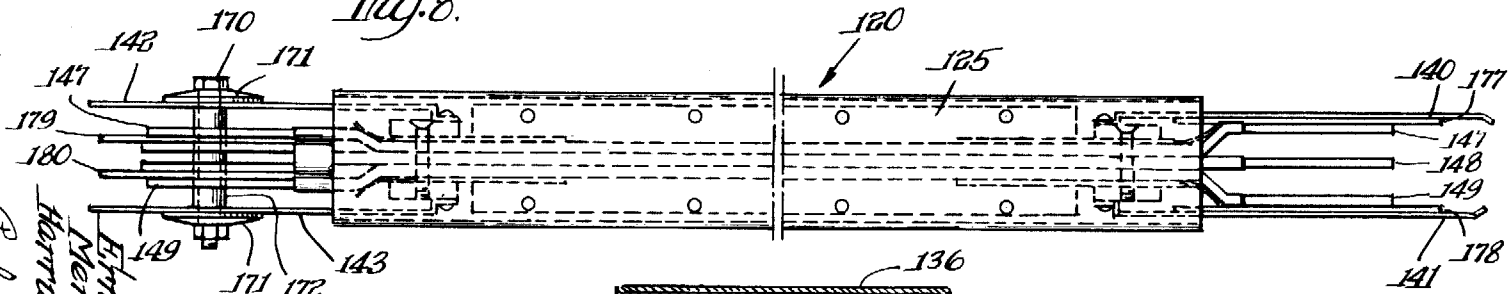
FIGURE 8 is a plan view of the section of the bus duct shown in FIGURE 7.
Figure 9:
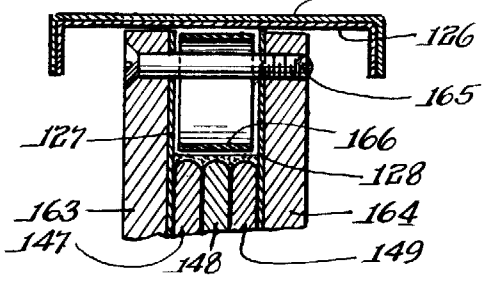
FIGURE 9 is a fragmentary sectional view taken along line 9—9 of FIGURE 7.

FIGURES 10, 11, and 12 are views similar to FIGURES 7, 8, and 9, respectively, but illustrating a section of bus duct having four bus bars instead of three.

Figure 1:
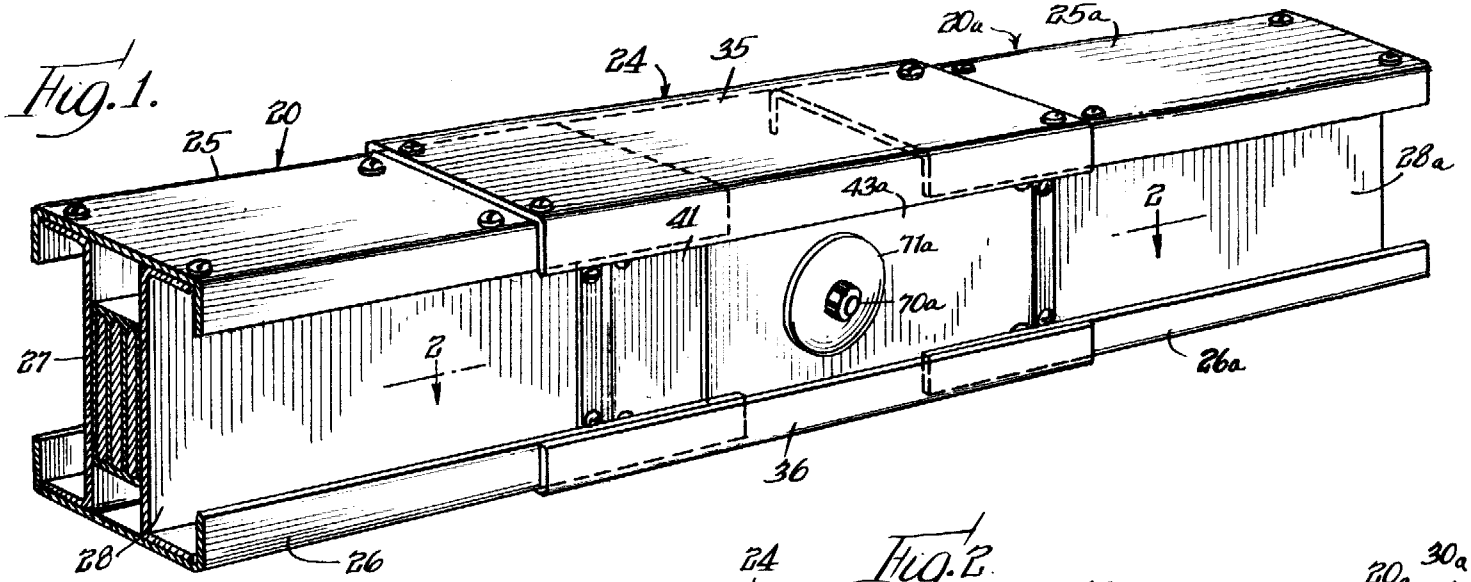
FIGURE 1 is a perspective view of an improved joint construction formed in accordance with the invention, the outer ends of the two sections of bus duct being cut away at right angles to the longitudinal axes of the two sections.

In FIGURE 1 portions of a pair of bus duct sections 20 and 20a and a joint therebetween are shown. The bus duct section 20 includes a housing formed of a pair of channels 25 and 26 facing toward each other and a pair of channels 27 and 28 facing away from each other and substantially at right angles to channels 25 and 26, the four channels being interconnected to define a box-like structure. The bus duct section 20a has channels identical to those of the bus duct section 20, as indicated by numerals 25a, 26a, 27a (FIG. 2) and 28a, respectively. As shown most clearly in FIGURE 5 with respect to the bus duct section 20, the channel 27 has sidewalls 29 and 30 bolted to the bottom of channels 25 and 26, respectively, and the channel 28 has sidewalls 31 and 32 bolted to the bottoms of channels 25 and 26, respectively, as by bolts 33, and the bottoms of channels 27 and 28 are wider than the bottoms of channels 25 and 26 to space the bottoms of channels 27 and 28 closer together than the bottoms of channels 25 and 26. The channels 25 and 26 are preferably made of steel and the channels 27 and 28 of aluminum.

The joint 24 is closed on two sides by tie channels 35 and 36 which secure the bus duct sections 20 and 20a relatively to each other, the tie channel 35 overlapping and closing a space between the channels 25 and 25a and the tie channel 36 overlapping and closing a space between the channels 26 and 26a. The adjacent ends of the bus duct sections may be provided with tapped holes in the channels 25, 26, 25a, and 26a which receive screws such as screws 37 (FIGS. 3 and 4) extending through holes in the opposite ends of the tie channels 35 and 36 which holes are respectively aligned with the tapped holes.

The joint 24 is closed on the other two sides by overlapping inner and outer joint covers, inner joint covers 40 and 41 being secured to the bus duct section 20 and outer joint covers 42a and 43a being secured to the bus duct section 20a. The inner joint covers 40 and 41 have inwardly tapered outer ends at 38 and 39 for easy telescoping within the outer joint covers 42a and 43a. It will be understood that the opposite cut-away end of the bus duct section 20 has outer joint covers 42 and 43 identical to the outer joint covers 42a and 43a on the bus duct section 20a, and that the opposite cut-away end of the bus duct section 20a has inner joint covers identical to the inner joint covers 40 and 41 on the bus duct section 20. This construction and arrangement can be readily observed in FIGURE 8, where a bus duct section 120 identical to the bus duct sections 20 and 20a is fully shown.

The bus duct section 20 contains three bus bars 47, 48, and 49 identical to three bus bars 47a, 48a, and 49a of the bus duct section 20a. As shown in FIGURE 5 with respect to the bus duct section 20, insulation for the bus bars 47, 48 and 49 is provided in the form of phenolic, polycarbonate, or polyester sheets 51, 52, 53, and 54 interleaved between the bus bars and between the outer bus bars and the channels 27 and 28. In addition, the individual bus bars, exclusive of their ends, are covered before assembly either with a thin coat (not shown) of an epoxy resin compound or mixture or a coat of fiberglass tape or both. Further, strips 55 and 56 of electrical tape are applied over opposite edges of the bus bars in overlapping relationship with the edges of sheets of insulation 51 and 54, and then the assembly as thus far described is wrapped in fiberglass tape 57 impregnated with an epoxy resin compound. The wrapped bus bars are then bonded to the channels 27 and 28 by coats 59 and 60 of an epoxy resin compound applied to the channels 27 and 28, respectively.

An alternate construction is shown in FIGURE 6, wherein the bus bars 47', 48', and 49' are first individually etched and coated with a first coat of an epoxy resin compound. The first coat is allowed to cure to a semi-plastic state and the bus bars are then bonded to each other and to the channels 27' and 28' by a second coat of the epoxy resin compound, no other insulation being used. The epoxy resin compound is indicated by numeral 61. If desired, curing of the epoxy resin coatings may be done under heat and pressure to eliminate formation of bubbles. An epoxy resin compound which has been found suitable for this purpose is formulated of the following materials in the weight percentages listed:

| | |
|---|---|
| Epoxy Resin (epichlorohydrin-bisphenol) | 63.40 |
| Triphenol phosphite | 5.85 |
| Cardolite (cashew nut oil) | 6.44 |
| Alkyl ammonium montmorillonite | 1.16 |
| Colloidal silica | 1.16 |
| Aluminum oxide | 4.20 |
| Titanium dioxide | .42 |
| Ion oxide | 3.78 |
| Asbestos | 8.88 |
| Mica | 4.39 |
| Magnesium oxide | .32 |

The hardener for use with the above epoxy resin compound has the following constituents in the weight percentages listed:

| | |
|---|---|
| Polyamide resin | 57.9 |
| Primary adducted amine | 33.6 |
| Triethylenetetramine | 8.5 |

Nineteen pounds of the hardener are used with each one hundred pounds of the epoxy resin compound.

Other compounds may be used, providing they have high dielectric strength and good thermal transmission and have good values of mechanical properties such as flexibility, tensile strength, toughness, thermal shock resistance, and impact resistance.

The bus bar and channel assemblies are clamped together adjacent opposite ends. For example, with respect to the bus duct section 20a, steel plate clamps 63a and 64a (see FIG. 2) are provided to clamp channels 27a and 28a and bus bars 47a, 48a, and 49a together at one end. The sidewalls 30a and 32a of the channels end short of the clamps. The clamp 64a may be provided with threaded holes adjacent opposite ends and the clamp 63a provided with countersunk holes to receive a pair of clamping screws 65a. A spool 66a of vulcanized fiber is provided around each screw 65a to act as a fire barrier, the arrangement being more clearly shown with respect to the bus duct section 120 in FIGURE 9. The outer joint covers 42a and 43a are secured to the clamps 63a and 64a, respectively, by screws 67a.

Figure 2:
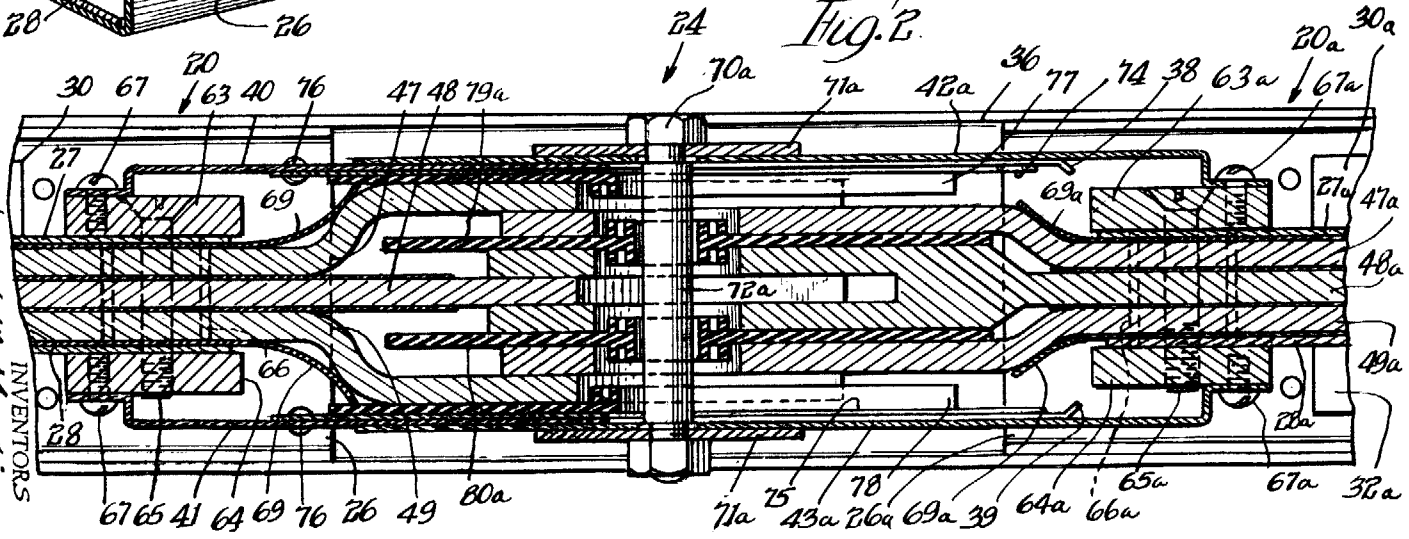
FIGURE 2 is an enlarged sectional view of the improved joint construction taken substantially along the line 2—2 of FIGURE 1.

Similar clamps 63 and 64 and clamping screws 65 are provided for the end of the bus duct section 20 shown in FIGURE 2 to clamp the bus bars 47, 48, and 49 and channels 27 and 28. Fire barrier spools 66 are provided around screws 65. The inner joint covers 40 and 41 are secured to the clamps 63 and 64, respectively, by screws 67.

The middle bus bar 48 is straight at the end thereof shown in FIGURE 2, while its other end is forked in the manner of the end of bus bar 48a shown in FIGURE 2. The forked portion may be formed by welding two plates to the end of a straight bar on opposite sides thereof. Alternately, the forked end may be formed by longitudinally splitting the end of a straight bar and offsetting the split portions in opposite directions. The outer bus bars 47 and 49 are flared or offset outwardly at the respective ends thereof shown in FIGURE 2, while at their other ends they are flared or offset outwardly to a lesser degree, in the manner of the ends of bus bars 47a and 49a shown in FIGURE 2. The arrangement is such that the adjacent ends of the bus bars in the bus duct sections 20 and 20a may be interleaved in the joint 24, the bus bars 47 being in electrical contact with the bus bar 47a, the bus bar 48 being in electrical contact with the bus bar 48a, and the bus bar 49 being in electrical contact with the bus bar 49a.

Vulcanized fiber sheet insulators 69 are provided at the offsetting portions adjacent the ends of the bus bars 47 and 49, and correspondingly, vulcanized fiber sheet insulators 69a are provided at the offsetting portions adjacent the ends of the bus bars 47a and 49a. The insulators 69 are clamped between the clamps 63 and 64 against the bus bars 49 and 47, and the insulators 69a are clamped between the clamps 63a and 64a against the bus bars 49a and 47a respectively.

A nut and bolt assembly 70a including two deformable pressure-loading washers 71a and an insulating sheath 72a is provided in order that the interleaved adjacent ends of the bus bars may be subjected to pressure for effecting good electrical contact.

The inner joint covers 40 and 41 have sheets of polyester insulation 74 and 75 secured respectively thereto by rivets 76. Molded alkyd resin insulators 77, 78, 79a and 80a are also provided in the joint 24 as shown, the insulators 77 and 78 being respectively between the inner joint covers 40 and 41 and the ends of the outer bus bars 47 and 49, and the insulators 79a and 80a being respectively between the ends of the outer bus bars 47a and 49a and the forked end of inner bus bar 48a. The insulators 77, 78, 79a, and 80a may have beaded edges to minimize chances of leakage current therearound in case of the presence of moisture and are retained in position during shipment of the bus duct sections by bosses thereon (not shown) which are received in corresponding holes (not shown, but see corresponding holes 181 and 182 in the bus bars of the bus duct section 120 of FIGURE 7) in the respective bus bars, the insulators 79a and 80a being additionally retained by the sheath 72a of the bolt assembly 70a. The bolt assembly 70a is retained in position during shipment in holes through the bus bars 47a, 48a, and 49a and the outer joint covers 42a and 43a. The inner joint covers 40 and 41, the insulation sheets 74 and 75, the insulators 77 and 78, and the ends of the bus bars 47, 48, and 49 are all slotted as indicated by the unsectioned portions thereof in FIGURE 2 and by dotted lines in FIGURE 3 so that the two bus duct sections 20 and 20a may be telescoped together without removal of the bolt assembly 70a. Thus, once hangers are installed, the bus duct sections may be assembled in place on the hangers without the use of tools, the bolt assembly 70a already in place and the tie channels 35 and 36 already secured to one of the bus duct sections being sufficient to hold the bus duct sections in assembled relationship on the hangers. After the bus duct sections are hung, four screws 37 may be inserted to secure tie channels 35 and 36 to the other bus duct section, and the bolt assembly 70a may be tightened to insure good electrical contact between the respective bus bars.

It should be noted that one bus duct section may be laterally removed from the middle of a series of bus duct sections without disturbing the others, after first removing the bolt assemblies 70a and the lower tie channels 36 from the opposite ends of the bus duct section to be removed and loosening it from the upper tie channels 35.

FIGURES 7, 8, and 9 show a single bus duct section 120 which is identical to the bus duct sections 20 and 20a. It will be noted that the right end of the bus duct section 120 in FIGURE 8 is identical to the portion of the bus duct section 20 shown in FIGURE 2, and that the left end of the bus duct section 120 in FIGURE 8 is identical to the portion of the bus duct section 20a shown in FIGURE 2. The identical parts are correspondingly numbered, except that the parts of FIGURES 7, 8, and 9 have been identified by numerals 100 higher than the numerals identifying the parts of FIGURES 1 and 2. For clarity, the tie channels 135 and 136, shown on the right end of the bus duct section 120 in FIGURE 7, have been omitted from FIGURE 8. It should be noted that the tie channels could also be secured to the left end of bus duct section 120, or one to the left end and the other to the right end, as assembled for storage or shipment.

For clarity, inner joint covers 140 and 141, outer joint covers 142 and 143, insualtors 177 and 178, and the bolt assembly 170 with washers 171 and insulative sheath 172, shown in FIGURE 8, have been omitted from FIGURE 7.

The holes 181 (FIG. 7) extend through the bus bars 147, 148, and 149 for the reception of oppositely extending bosses on the insulators 179 and 180, such as bosses 183 on the insulator 179. Further, the insulator 177 is held in position between the bus bar 147 and the inner joint cover 140 by bosses (not shown) extending into the holes 182 in the bus bar 147, and the insulator 178 is similarly held between the bus bar 149 and the inner joint cover 141.

It should be understood that the bus bar 148 could be reversed with respect to the bus bars 147 and 149 (i.e., the forked end of the bus bar 148 could be the right end in FIGURE 8 if it were soltted and the straight end could be the left end if it were provided with a hole for reception of the bolt assembly 170) without interfering with proper interleaving of the bus bars in the serial connection of like bus duct sections. Stated another way, all the bus duct sections to be serially connected could be assembled with the forked end of the bus bar 148 between the ends of the bus bars 147 and 149 having the greater offset, the forked end of the bus bar 148 being slotted far such manner of assembly.

FIGURE 10, 11, and 12 show a bus duct section 220 similar to the bus duct section 120 of FIGURES 7, 8 and 9, but having four bus bars 245, 246, 247, and 249, instead of three. Again, identical or corresponding parts are correspondingly numbered, except that the parts of FIGURES 10, 11, and 12 have been identified by numerals 100 higher than the numerals identifying the parts of FIGURES 7, 8, and 9 and 200 higher than the numerals identifying the parts of FIGURES 1 and 2.

For clarity, the tie channels 235 and 236, shown on the right end of bus duct section 220 in FIGURE 10, have been omitted from FIGURE 11. Again, it should be noted that for storage and shipment, the tie channels could also be assembled on the left end of the bus duct section 220, or one tie channel could be secured to the left end and the other to the right end.

For clarity, the outer joint covers 242 and 243, and the bolt assembly 270, including the washers 271 and insulative sheath 272, shown at the left end of FIGURE 11, and the inner joint covers 240 and 241 and the insulators 277 and 278, shown at the right end of FIGURE 11, have been omitted from FIGURE 10.

The bus bars 247 and 249 are similar to the bus bars 147 and 149, respectively, but the bus bar 148 of FIGURES 8 and 9 has been replaced by the two bus bars 245 and 246 as shown in FIGURES 11 and 12, and insulator 285 has been provided between the bus bars 245 and 246 as shown at the right end of FIGURE 11.

It should be understood the outer bus bars 247 and 249 could be reversed with respect to the two intermediate bus bars 245 and 246 so long as the proper hole and slot arrangement for the bolt assembly 270 at the opposite ends of the bus bars is maintained. That is, location of the straight ends of the bus bars 245 and 246 between the ends of the bus bars 247 and 249 having the lesser offset would not of itself interfere with proper interleaving of bus bars in the serial connection of like bus duct sections.

It should be further pointed out that the bus bars 245 and 246 are identical to each other, and that the bus bars 147, 149, 247, and 249 may be made identical to each other, so that both the three bus bar and the four bus bar types of bus duct sections may be assembled from only three diffeernt types of bus bars.

The holes 281 and 282 (FIGURE 10) extend through all four bus bars for the purpose of receiving bosses on the insulators 277, 278, 279, 280, and 285 to retain the insulators in place. For example, see the bosses 283 on the insulator 279 and bosses 284 on the insulator 285.

It will be seen that we have provided an improved bus duct construction wherein the bus bars are spaced closer together than formerly, resulting in decreased reactance and greater efficiency. It will also be seen that we have provided an improved joint construction for bus ducts, whereby standard lengths of bus duct may be more readily serially connected and installed. Further, it will be seen that we have provided an improved method for insulating bus bars and an improved bus duct housing, resulting in a more compact bus duct than formerly.

Various modifications may be made in the structure disclosed without departing from the spirit and scope of the invention.

We claim:

1. A bus duct comprising housing means and an assembly of bus bars, said housing means including a first pair of spaced parallel channels, each channel of said first pair having a bottom portion and a pair of side wall portions extending from the bottom portion toward the other channel of said first pair, and a second pair of spaced parallel channels at right angles to said first pair, each channel of said second pair having a bottom portion and a pair of side wall portions extending from the bottom portion, the side wall portions of said second pair of channels being respectively secured to the bottom portions of said first pair of channels, and the bottom portions of said second pair of channels being spaced closer together than the bottom portions of said first pair, said assembly of bus bars being disposed in said housing means and electrically insulated from and secured on opposite sides solely to the respective bottom portions of said second pair of channels in spaced relationship to the bottom portions of said first pair of channels by an electrically insulating heat conducting adhesive material.

2. A bus duct as claimed in claim 1 wherein said assembly of bus bars includes a plurality of elongated flat bus bars arranged in flatwise closely spaced relation to each other, sheets of insulation respectively filling the spaces between adjacent bus bars, sheets of insulation respectively engaging the outer sides of the outer bus bars, strips of insulating tape extending longitudinally along the respective opposite edges of said plurality of bus bars, each of said strips having one edge overlapping an edge of one of the outer sheets of insulation and another edge overlapping an edge of the other outer sheet of insulation, and tape impregnated with an epoxy resin compound and would generally transversely around said bus bars, sheets of insulation, and strips of insulating tape.

3. A bus duct comprising housing means and an assembly of bus bars contained therein, said housing means including a first pair of spaced parallel channels, each channel of said first pair having a bottom portion and a pair of side wall portions extending from the bottom portion toward the other channel of said first pair, and a second pair of spaced parallel channels at right angles to said first pair, each channel of said second pair having a bottom portion and a pair of side wall portions extending from the bottom portion, the side wall portions of said second pair of channels being respectively secured to the bottom portions of said first pair of channels, and the bottom portions of said second pair of channels being spaced closer together than the bottom portions of said first pair, said bus bars being electrically insulated from and secured to each other in stacked relationship by an electrically insulating heat conducting adhesive material, and said assembly being electrically insulated from and secured solely to the bottom portions of said second pair of channels in spaced relationship to the bottom portions of said first pair of channels by an electrically insulating heat conducting adhesive material.

4. A bus duct including a housing having two pairs of opposing walls and an assembly of bus bars within said housing between said walls, said bus bars being electrically insulated from and secured to each other in stacked relationship by an electrically insulating heat conducting adhesive material and said assembly being electrically insulated from an secured solely to one pair of opposing walls in spaced relaionship to the other pair of opposing walls by an electrically insulating heat conducting adhesive material.

5. A bus duct as claimed in claim 4 wherein the basic ingredient of said adhesive material is an epoxy resin.

6. A bus duct including a housing having two pairs of opposing walls and an assembly of bus bars within said housing, said assembly being electrically insulated from and secured by an electrically insulating heat conducting adhesive material solely to one of said pairs of opposing walls in spaced relationship to the other of said pairs of opposing walls.

7. A bus duct as claimed in claim 6, wherein said assembly includes at least three flat bus bars flatwise aligned parallel to said one pair of opposing walls.

8. A bus duct including an elongated housing having a generally rectangular opening extending longitudinally therethrough, an assembly of bus bars in said opening secured solely to and electrically insulated from a first pair of opposing walls defining said opening by an epoxy resin compound and spaced from a second pair of opposing walls defining said opening, and means solely adjacent opposite ends of said bus bar assembly preventing relative movement of the ends of said bus bars in a direction perpendicular to said first pair of opposing walls to which said bus bar assembly is secured.

9. A bus duct as claimed in claim 8, including fire barrier means adjacent opposite ends of said bus bar assembly and between said bus bar assembly and said second pair of opposite walls defining said opening.

10. A bus duct as claimed in claim 8, wherein said relative movement preventing means includes a pair of clamping plates adjacent each end of said bus bar assembly and each clamping plate has a joint cover mounted thereon adapted to be received in telescoping relationship with a joint cover on a clamping plate of another bus duct.

11. A bus duct section adapted to be serially connected to other like bus duct sections, said bus duct section including a housing and at least three elongated flat bars arranged in flatwise closely spaced relation to each other and extending through said housing and projecting beyond opposite ends thereof, the ends of the outer two bus bars adjacent one end of the housing being equally and oppositely outwardly offset a predetermined amount from the portions thereof within said housing and the ends thereof adjacent the other end of the housing being equally and oppositely outwardly offset a predetermined greater amount, and an intermediate one of said bus bars having a straight projecting end aligned with the portion thereof within said housing and having an offset portion at the other projecting end, whereby one end of said bus duct section may be serially connected to a like bus duct section at the end thereof corresponding to the other end of said first bus duct section with the adjacent ends of the bus bars of the two bus duct sections interleaved.

12. A bus duct section as claimed in claim 11, wherein the straight projecting end of said intermediate bus bar is between the ends of said outer bus bars having the greater offset.

13. A bus duct section as claimed in claim 11, wherein there are a total of three bus bars and the end of the intermediate bus bar having an offset portion is provided with two oppositely offset portions forming a forked end.

14. A bus duct section as claimed in claim 11, wherein there are a total of four bus bars and each intermediate bus bar has one substantially straight end and one outwardly offset end.

15. A bus duct section as claimed in claim 11, wherein insulators are provided in association with the ends of the bus bars projecting from one end of the housing and whereby, when two such bus duct sections are serially connected, each bus bar in one duct section is electrically connected to a corresponding bus bar in the other duct section and electrically insulated from the other bus bars in said other duct section.

16. A bus duct section as claimed in claim 15, wherein a pair of joint covers is provided adjacent each end of said housing in association with the projecting ends of the bus bars.

17. A bus duct section as claimed in claim 16, wherein one end of said bus duct section is provided with a bolt extending transversely through the respective pair of joint covers and the respective ends of said bus bars and the insulators associated therewith and the other end of said bus duct section is provided with axial slots in the other pair of joint covers and the other ends of said bus bars, and whereby when two such bus duct sections are serially connected the slotted end of one receives the bolt of the other without removal of the bolt of said other bus duct section, said bolt of said other bus duct section being provided with a nut which may be tightened to apply pressure to the electrically connected bus bar ends.

18. A bus duct as claimed in claim 1, including clamping means applied to the other surfaces of the bottom portions of said second pair of channels solely adjacent opposite end portions thereof.

19. A bus duct comprising a housing having a pair of opposing walls, an assembly of bus bars contained in said housing and electrically insulated from and secured solely to said pair of opposing walls by an electrically insulating heat conducting adhesive material, and clamping means clamping said housing and assembly solely adjacent longitudinally opposite end portions thereof.

20. An assembly of bus bars comprising a plurality of elongated flat bus bars arranged in flatwise closely spaced relationship to each other, and means for holding said bus bars in assembled relationship against forces generated by flow of excessive overload current through said bus bars, said holding means comprising tape wound generally spirally around said plurality of bus bars as a group and extending substantially the full length of said bus bars but terminating short of the ends thereof, and clamping means solely adjacent opposite ends of said bus bars for holding the ends of said bus bars together and preventing said tape from starting to tear longitudinally of said bus bars adjacent the ends thereof.

21. An assembly of bus bars as claimed in claim 20, wherein said tape is impregnated with an epoxy resin compound.

22. A bus duct comprising a housing and an assembly of bus bars contained therein, said housing including a first pair of spaced parallel channels and a second pair of spaced parallel channels at right angles to said first pair, each channel of said first pair having a bottom portion and a pair of side wall portions extending from the bottom portion toward the other channel of said first pair, each channel of said second pair having a bottom portion and a pair of side wall portions extending from the bottom portion, the side wall portions of said second pair of channels being respectively secured to the bottom portions of said first pair of channels, and the bottom portions of said second pair of channels being spaced closer together than the bottom portions of said first pair, said assembly of bus bars forming a substantially solid connection between the bottom portions of said second pair of channels and along the length thereof for a major portion of the length thereof between opposite end portions of said bus bars.

23. A bus duct as claimed in claim 22, wherein said assembly of bus bars includes at least three flat bus bars flatwise aligned parallel to the bottom portions of said second pair of channels and spaced closer to each other than the thickness of any one.

24. A bus duct including an elongated housing having first and second pairs of opposing walls and an assembly of flat elongated bus bars contained in said housing, said assembly forming a substantially solid connection between said first pair of opposing walls and along the length thereof for a major portion of the length thereof between opposite end portions of said bus bars, said assembly being spaced from said second pair of opposing walls respectively by a pair of air spaces on opposite sides of said assembly, said bus bars being substantially flatwise aligned in said assembly, and the flat sides of said bus bars being disposed substantially parallel to said first pair of opposing walls.

25. A bus duct comprising an elongated housing and an assembly of flat elongated bus bars contained in said housing, said housing including a first pair of spaced parallel channels and a second pair of spaced parallel channels at right angles to said first pair, each channel of said first pair having a bottom portion and a pair of side wall portions extending from the bottom portion toward the other channel of said first pair, each channel of said second pair having a bottom portion and a pair of side wall portions extending from the bottom portion, the side wall portions of said second pair of channels being respectively secured to the bottom portions of said first pair of channels, the bottom portions of said second pair of channels being spaced closer together than the bottom portions of said first pair, said assembly of bus bars forming a substantially solid connection between the bottom portions of said second pair of channels and along the length thereof for a major portion of the length thereof between opposite end portions of said bus bars, said assembly of bus bars being spaced from the bottom portions of said first pair of channels respectively by a pair of air spaces on opposite sides of said assembly, said bus bars being substantially flatwise aligned in said assembly, and the flat sides of said bus bars being disposed substantially parallel to the bottom portions of said second pair of channels.

*26. An elongated bus duct section adapted to be connected adjacent opposite ends respectively to a pair of other like bus duct sections, said bus duct section comprising an elongated housing and an insulated bus bar assembly including at least three elongated generally flat bus bars of solid elongated cross section and generally equal thicknesses, said housing including a first pair of housing members providing a first pair of spaced generally parallel wall portions having said bus bar assembly disposed therebetween and a second pair of housing members secured to said first pair of housing members and providing a second pair of spaced generally parallel wall portions having said bus bar assembly disposed therebetween, said second pair of wall portions being disposed between and extending generally perpendicularly to said first pair of wall portions defining an enclosure for said bus bar assembly and being spaced closer together than said first pair of wall portions, each of said bus bars including an elongated intermediate portion disposed generally within said housing and a pair of opposite end portions disposed outside said housing respectively adjacent opposite ends thereof, said bus bars being flatwise aligned and the intermediate portions thereof having their flat sides and longer cross sectional dimensions disposed generally parallel to said second pair of wall portions, said intermediate portions of said bus bars being spaced from each other in a manner such that the distance between intermediate portions of each pair of adjacent bus bars is less than the thickness of one of said bus bars, said bus bar assembly forming a substantially solid connection between said second pair of wall portions and, being spaced generally equally from said first pair of wall portions, and each of the opposite end portions of each of an outer pair of said bus bars disposed respectively adjacent said second pair of wall portions being outwardly offset from the intermediate portion thereof.*

*27. A bus duct section as claimed in claim 26, wherein the intermediate portion of each of said outer pair of said bus bars is spaced from its respective adjacent wall portion of said second pair by a distance less than the thickness of one of said bus bars.*

*28. A bus duct section as claimed in claim 27 wherein the spaces respectively between said intermediate portions of said pairs of adjacent bus bars and the spaces respectively between said intermediate portions of said outer bus bars and said second pair of wall portions are filled with insulation.*

*29. A bus duct section as claimed in claim 26, wherein each of the end portions of said bus bars adjacent one end of said housing has an opening therethrough, the respective openings being aligned so that a bolt can be passed lengthwise therethrough, and each of the end portions of said bus bars adjacent the other end of said housing has an elongated slot extending inwardly longitudinally of the bus bar from an end face thereof, the respective slots being aligned so that the slotted end portions can receive a bolt positioned in the openings in end portions of the bus bars of another like duct section by relative longitudinal movement of the duct sections.*

*30. A bus duct comprising a housing and an assembly of bus bars contained therein, said housing including a first pair of spaced parallel channels and a second pair of spaced parallel channels at right angles to said first pair, each channel of said first pair having a bottom portion and a pair of side wall portions extending from the bottom portion, each channel of said second pair having a bottom portion and a pair of side wall portions extending from the bottom portion, the side wall portions of said second pair of channels being respectively secured to the bottom portions of said first pair of channels, and the bottom portions of said second pair of channels being spaced closer together than the bottom portions of said first pair, said assembly of bus bars forming a substantially solid connection between the bottom portions of said second pair of channels and along the length thereof for a major portion of the length thereof between opposite end portions of said bus bar.*

References Cited

The following references, cited by the Examiner, are of record in the patented file of this patent or the original patent.

UNITED STATES PATENTS

| | | | |
|---|---|---|---|
| 276,891 | 5/1883 | Sanderson | 174—98 X |
| 375,633 | 12/1887 | James | 174—98 X |
| 2,043,796 | 6/1936 | Frank | 174—68 |
| 2,341,841 | 2/1944 | Carlson | 174—99 |
| 2,350,601 | 6/1944 | Frank et al. | 174—68 X |
| 2,653,991 | 9/1953 | Dyer et al. | 174—117 X |
| 2,808,451 | 10/1957 | Duche | 174—209 X |

(Other references on following page)

UNITED STATES PATENTS

| | | | |
|---|---|---|---|
| 2,966,542 | 12/1960 | Shields | 174—88 |
| 2,970,936 | 2/1961 | Richardson | 174—120 X |
| 3,004,096 | 10/1961 | Rowe | 174—88 |
| 3,011,009 | 11/1961 | Titus | 174—96 X |
| 3,018,320 | 1/1962 | Rowe | 174—99 |
| 3,031,521 | 4/1962 | Krauss et al. | 174—88 |
| 3,034,753 | 5/1962 | Johnston et al. | 174—99 X |
| 3,042,889 | 7/1962 | Johnston et al. | 174—88 X |

OTHER REFERENCES

Preiswerk et al.: "Ethoxylines," Modern Plastics, pp. 85–88, November 1950.

DARRELL L. CLAY, *Primary Examiner.*